United States Patent [19]
Bayer et al.

[11] Patent Number: 6,050,890
[45] Date of Patent: Apr. 18, 2000

[54] RETAINING DEVICE FOR MOUNTING A VIBRATING PART

[75] Inventors: Frank Bayer, Aidlingen; Eberhard Faust; Karl Pfahler, both of Stuttgart, all of Germany

[73] Assignee: DaimlerChrysler AG, Stuttgart, Germany

[21] Appl. No.: 08/956,414

[22] Filed: Oct. 23, 1997

[30] Foreign Application Priority Data

Oct. 23, 1996 [DE] Germany ................ 196 43 760

[51] Int. Cl.$^7$ .................................................. B60H 1/24
[52] U.S. Cl. .................... 454/120; 248/634; 248/638; 297/180.14; 454/907
[58] Field of Search .................. 454/120, 907; 297/180.14; 248/560, 603, 634, 638

[56] References Cited

U.S. PATENT DOCUMENTS

| | | | |
|---|---|---|---|
| 1,866,154 | 7/1932 | Ell | 248/638 X |
| 3,317,124 | 5/1967 | Morrill . | |
| 3,464,657 | 9/1969 | Bullard | 248/638 X |
| 3,984,194 | 10/1976 | Fermer et al. | 416/135 |
| 4,043,708 | 8/1977 | Greenfield | 248/603 X |
| 4,250,927 | 2/1981 | Newburg | 248/560 X |
| 4,325,133 | 4/1982 | Reitmayer | 248/638 X |
| 4,763,869 | 8/1988 | Nakamura et al. | 248/638 X |
| 5,521,447 | 5/1996 | Bertolini et al. | 310/51 |

FOREIGN PATENT DOCUMENTS

| | | | |
|---|---|---|---|
| 1.166.030 | 11/1958 | France | 297/180.14 |
| 33 04 236 | 8/1984 | Germany . | |
| 42 33 941 | 4/1993 | Germany . | |
| 43 07 778 | 9/1994 | Germany . | |
| 196 05 779 | 7/1996 | Germany . | |
| 624256 | 6/1949 | United Kingdom . | |
| 93/04289 | 3/1993 | WIPO . | |

*Primary Examiner*—Harold Joyce
*Attorney, Agent, or Firm*—Evenson, McKeown, Edwards & Lenahan, P.L.L.C.

[57] ABSTRACT

A retaining device having an elastic annular collar as a retainer for mounting a vibrating part to obtain, in a constructionally simple manner, good outward encapsulation, for fitting it into a soft part. The retaining device is a retaining ring which surrounds the vibrating part at a radial distance and has longitudinal slots which are distributed around the circumference and run in the circumferential direction. Pins are provided adjacent to and perpendicular to the slots, on which the elastic annular collar is mounted, such that the elastic annular collar does not come into contact with the retaining ring.

18 Claims, 1 Drawing Sheet

RETAINING DEVICE FOR MOUNTING A VIBRATING PART

BACKGROUND AND SUMMARY OF THE INVENTION

This application claims the priority of 196 43 760.1, the disclosure of which is expressly incorporated by reference herein.

The invention relates to a retaining device for mounting a vibrating part, and more particularly to a retaining device for mounting a fan driven by an electric motor.

Retaining devices of this type having individual clamping means which can be attached radially are known from German patent document DE 33 04 236 C2 and U.S. Pat. No. 3,317,124. In both cases, these are individual clamping means which, distributed around the circumference in the annular space between the fan housing and retaining device, are coupled to the fan housing and retaining device, respectively. The elastic retaining means in each case serve the purpose of keeping the vibrations occurring in a fan driven by an electric motor away from the retaining device.

Also known, from WO 93/04289, as retaining means are elastic clamping rings which enclose the entire fan and are retained on webs of a plate-shaped receiving part. In this case, the clamping rings are outwardly open. As a result, when a vibrating part within a retaining device of this type is fitted into a soft body there is the risk of parts of the soft body bearing against the clamping rings and hence hindering their function.

In view of the above, there is a need for a retaining device for a vibrating part, particularly an electric fan, which is relatively simply configured by outward encapsulation of the clamping elements, and yet effectively dampens any vibrations.

These and other needs have been met according to the present invention by providing a retaining device for mounting a vibrating part, comprising: a retaining ring to be positioned around the vibrating part at a radial distance, said retaining ring defining a plurality of circumferential slots spaced apart from each other; an elastic band coupled to said retaining ring at each of said slots via a pin arranged at an exterior surface of each of said slots, respectively, said elastic band and said pins being arranged such that said elastic band passes through said slots without contacting said retaining ring and engaging said pins on a surface facing radially outwardly relative to said retaining ring, said elastic band to be fixedly coupled to said vibrating part in portions between said pins.

These and other needs have also been met by providing an arrangement, comprising: an electric fan supported in a housing; a retaining ring positioned around the housing at a radial distance, said retaining ring defining a plurality of circumferential slots spaced apart from each other; an elastic band coupled to said retaining ring at each of said slots via a pin arranged at an exterior surface of each of said slots, respectively, said elastic band and said pins being arranged such that said elastic band passes through said slots without contacting said retaining ring and engaging said pins on a surface facing radially outwardly relative to said retaining ring, said elastic band being fixedly coupled to said housing in portions between said pins.

These and other needs have also been met by providing an arrangement, comprising: a motor vehicle seat; a retaining ring mounted in an interior of said seat, said retaining ring defining a plurality of circumferential slots spaced apart from each other; an elastic band coupled to said retaining ring at each of said slots via a pin arranged at an exterior surface of each of said slots, respectively, said elastic band and said pins being arranged such that said elastic band passes through said slots without contacting said retaining ring and engaging said pins on a surface facing radially outwardly relative to said retaining ring; and an electric fan having a housing fixedly coupled to portions of said elastic band located between said pins.

The annular band vibrates in its mounts on the retaining device in a similar manner to the strings of a stringed instrument. The mounts for the annular band in the retaining device act in the same manner as the peg of a stringed instrument. In the immediate vicinity of the mount, which is designed as a retaining pin, the vibration amplitudes of the tensioned elastic annular band approach zero. In this manner, virtually no vibrations are passed from the fan to the retaining ring. A fan mounted, in accordance with the invention, elastically in a retaining ring is suitable, in particular, for fitting into the interior of a motor vehicle seat to be ventilated by a fan of this type. With the retaining ring, the fan may be tightly inserted directly into the seat's filling.

Other objects, advantages and novel features of the present invention will become apparent from the following detailed description of the invention when considered in conjunction with the accompanying drawings.

DETAILED DESCRIPTION OF THE DRAWINGS

Figure 1:
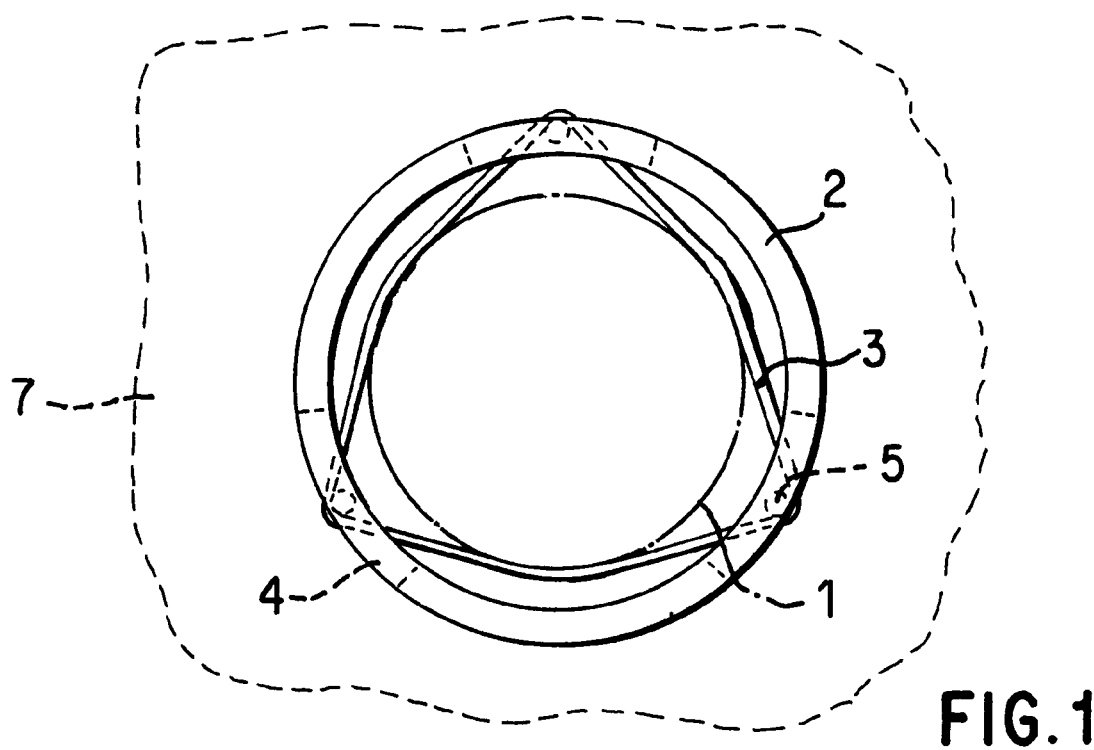
FIG. 1 shows an axial view of a retaining ring with an axial fan mounted therein.
Figure 2:
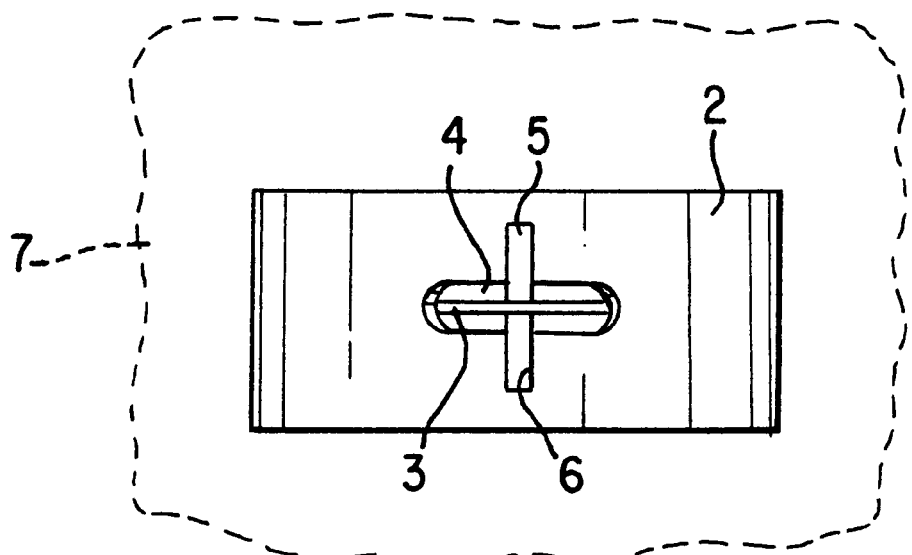
FIG. 2 shows a radial view of the retaining ring taken from above in FIG. 1.

Referring to FIGS. 1–2, a fan housing 1, indicated by dash-dotted lines, of a fan which is driven by an electric motor is mounted elastically in a retaining ring 2 radially surrounding said housing 1. The retaining ring 2 is mounted in the interior of a motor vehicle seat 7.

The elastic mounting is provided by an elastic annular band 3. This annular band 3 is secured on the fan housing 1 at three regions which are separated circumferentially from one another. The securing can be by bonding, for example with an adhesive, or by a positive lock against the fan housing 1 rotating within the annular band and against it being displaced axially with respect to the annular band. It is also possible to place the annular band 3 into a peripheral groove in the fan housing 1 and in this way to prevent said housing from migrating or moving.

Provided in the retaining ring 2, distributed over the circumference thereof, are three longitudinal slots 4, in the transverse direction of which in each case pins 5 extend and are fixed in this position in a positively locking manner. The annular band 3 lies in each case on these pins 5, in its regions which are not connected fixedly to the fan housing 1. The forces originating from the elastic material of the annular band 3 result in the pins 5 being positively locked in receiving channels in the retaining ring 2. The longitudinal slots 4 in each case have an opening cross section which is of sufficient size for the annular band 3 not to be able to have any contact with the retaining ring 2, apart from via the respective pin 5.

Apart from being suitable for fans driven by electric motors, the mounting according to the invention, with the aid of an elastic annular band 3, is basically suitable for any vibrating body, the vibrations of which are to be damped in relation to a retaining device.

The pins 5 may also be connected fixedly to the retaining ring 2 and may even be of integral design with the retaining ring.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A retaining device for mounting a vibrating part, comprising:

a retaining ring to be positioned around the vibrating part at a radial distance, said retaining ring defining a plurality of circumferential slots spaced apart from each other;

an elastic band coupled to said retaining ring at each of said slots via a pin arranged at an exterior surface of each of said slots, respectively, said elastic band and said pins being arranged such that said elastic band passes through said slots without contacting said retaining ring and engaging said pins on a surface facing radially outwardly relative to said retaining ring, said elastic band to be fixedly coupled to said vibrating part in portions between said pins.

2. A retaining device according to claim 1, wherein said pins are arranged transversely to said circumferential slots.

3. A retaining device according to claim 1, wherein said vibrating part is a fan which is driven by an electric motor.

4. A retaining device according to claim 3, wherein said fan is a ventilation fan to be fitted into the interior of a motor vehicle seat.

5. A retaining device according to claim 1, wherein said retaining ring further defines a plurality of receiving channels adjacent said slots, said pins being seated in said receiving channels.

6. A retaining device according to claim 1, wherein the pins and said retaining ring are a one-piece component.

7. A retaining device according to claim 1, wherein the elastic band is bonded to the vibrating part.

8. An arrangement, comprising:

an electric fan supported in a housing;

a retaining ring positioned around the housing at a radial distance, said retaining ring defining a plurality of circumferential slots spaced apart from each other;

an elastic band coupled to said retaining ring at each of said slots via a pin arranged at an exterior surface of each of said slots, respectively, said elastic band and said pins being arranged such that said elastic band passes through said slots without contacting said retaining ring and engaging said pins on a surface facing radially outwardly relative to said retaining ring, said elastic band being fixedly coupled to said housing in portions between said pins.

9. An arrangement according to claim 8, wherein said pins are arranged transversely to said circumferential slots.

10. An arrangement according to claim 8, wherein said fan is a ventilation fan to be fitted into the interior of a motor vehicle seat.

11. An arrangement according to claim 8, wherein said retaining ring further defines a plurality of receiving channels adjacent said slots, said pins being seated in said receiving channels.

12. An arrangement according to claim 8, wherein the pins and said retaining ring are a one-piece component.

13. An arrangement according to claim 8, wherein the elastic band is bonded to the housing.

14. An arrangement, comprising:

a motor vehicle seat;

a retaining ring mounted in an interior of said seat, said retaining ring defining a plurality of circumferential slots spaced apart from each other;

an elastic band coupled to said retaining ring at each of said slots via a pin arranged at an exterior surface of each of said slots, respectively, said elastic band and said pins being arranged such that said elastic band passes through said slots without contacting said retaining ring and engaging said pins on a surface facing radially outwardly relative to said retaining ring; and an electric fan having a housing fixedly coupled to portions of said elastic band located between said pins.

15. An arrangement according to claim 14, wherein said pins are arranged transversely to said circumferential slots.

16. An arrangement according to claim 14, wherein said retaining ring further defines a plurality of receiving channels adjacent said slots, said pins being seated in said receiving channels.

17. An arrangement according to claim 14, wherein the pins and said retaining ring are a one-piece component.

18. An arrangement according to claim 14, wherein the elastic band is bonded to the housing.

* * * * *